United States Patent
Rajvaidya et al.

(10) Patent No.: US 11,108,730 B2
(45) Date of Patent: Aug. 31, 2021

(54) GROUP HEARTBEAT INFORMATION IN A DOMAIN NAME SYSTEM SERVER TEXT RECORD

(71) Applicant: HEWLETT PACKARD ENTERPRISE DEVELOPMENT LP, Houston, TX (US)

(72) Inventors: Sudhanshu Rajvaidya, Fremont, CA (US); Ruta Vaidya, San Jose, CA (US); Manan Gupta, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 339 days.

(21) Appl. No.: 16/144,785

(22) Filed: Sep. 27, 2018

(65) Prior Publication Data
US 2020/0106738 A1  Apr. 2, 2020

(51) Int. Cl.
*H04L 29/12* (2006.01)
*H04L 12/26* (2006.01)

(52) U.S. Cl.
CPC ...... *H04L 61/1511* (2013.01); *H04L 43/0817* (2013.01); *H04L 43/10* (2013.01); *H04L 43/16* (2013.01)

(58) Field of Classification Search
CPC .............................. H04L 61/1511; H04L 43/10
See application file for complete search history.

(56) References Cited

U.S. PATENT DOCUMENTS

| | | | |
|---|---|---|---|
| 6,834,302 B1 | 12/2004 | Harvell |
| 7,451,359 B1 | 11/2008 | Coekaerts |
| 8,498,967 B1 | 7/2013 | Chatterjee et al. |
| 9,794,229 B2 | 10/2017 | Yu et al. |
| 2008/0040628 A1 | 2/2008 | Mandal |
| 2009/0276842 A1 | 11/2009 | Yevmenkin et al. |
| 2012/0159235 A1 | 6/2012 | Suganthi et al. |
| 2014/0229606 A1 | 8/2014 | Griswold et al. |
| 2016/0100056 A1 | 4/2016 | Kamboh et al. |

OTHER PUBLICATIONS

Almroth et al., "What are some creative uses for DNS TXT records?," available online at <https://www.quora.com/What-are-some-creative-uses-for-DNS-TXT-records>, forum posts, 2012-2017, 4 pages.
Charles Keenan, "Setting Up an HP-UX CSE Serviceguard Cluster," available online at <https://www.informit.com/articles/article.aspx?p=349748&seqNum=4>, HP-UX CSE: Official Study Guide and Desk Reference, Section 25.4, Nov. 24, 2004, 2 pages.
Citrix Systems, Inc., "Creating TXT Records for Holding Descriptive Text," available online at <https://docs.citrix.com/en-us/netscaler/12/dns/configure-dns-resource-records/create-txt-records-holding-desc-text.html>, Nov. 21, 2014, 2 pages.

(Continued)

*Primary Examiner* — Brian Whipple
(74) *Attorney, Agent, or Firm* — Hewlett Packard Enterprise Patent Department

(57) ABSTRACT

Examples include group heartbeat information in a Domain Name System (DNS) server text record. Examples include replacement of group heartbeat information, stored in a text record of a DNS server, with current group heartbeat information of a computing device indicating that the computing device has a group leader role for a group of computing devices.

20 Claims, 4 Drawing Sheets

(56) References Cited

OTHER PUBLICATIONS

Gerend et al., "Deploy a Cloud Witness for a Failover Cluster," available online at <https://web.archive.org/web/20170710194637/https://docs.microsoft.com/en-us/windows-server/failover-clustering/deploy-cloud-witness>, Sep. 15, 2016, pp. 1-10.
IBM Corporation, "NFS tiebreaker," IBM Tivoli System Automation for Multiplafforms, Version 4.1 documentation, available online at <https://www.ibm.com/support/knowledgecenter/en/SSRM2X_4.1.0/com.ibm.samp.doc_4.1/sampugnfstiebreaker.html>, accessed on Jul. 27, 2020, pp. 1-3.
IBM Corporation, "Types of tiebreakers," IBM Tivoli System Automation for Multiplafforms, Version 4.1 documentation, available online at <https://www.ibm.com/support/knowledgecenter/en/SSRM2X_4.1.0/com.ibm.samp.doc_4.1/sampugtypesoftiebreakers.html>, accessed on Jul. 27, 2020, pp. 1-3.
John Marlin, "Failover Cluster File Share Witness and DFS," available online at <https://techcommunity.microsoft.com/t5/failover-clustering/failover-cluster-file-share-witness-and-dfs/ba-p/372147>, Apr. 13, 2018, 7 pages.
Wikipedia, "Test-and-set," available online at <https://en.wikipedia.org/w/index.php?title=Test-and-set&oldid=829069283>, Mar. 6, 2018, 6 pages.
Almroth et al., "What are some creative uses for DNS TXT records?," forum posts, dated 2012-2017, <https://www.auora.com/What-are-some-creative-uses-for-DNS-TXT-records>.
Björn Edström, "In praise of 'boring' technology," Feb. 25, 2013, <https://labs.spotify.com/2013/02/25/in-praise-of-boring-technology/>.
Cisco Systems, Inc., "Configuring High-Availability DNS Servers," User Guide for Cisco Prime Network Registrar, 8.0, Chapter 19, pp. 19-1-19-10, <https:/www.cisco.com/c/en/us/td/docs/net_mgmt/prime/network_registrar/8-0/user/guide/User_Guide_for_CNR_8-0/UG19_HAD.pdf>.
Citrix Systems, Inc., "Creating TXT Records for Holding Descriptive Text," Nov. 21, 2014, <https://docs.citrix.com/en-us/netscaler/12/dns/configure-dns-resource-records/create-txt-records-holding-desc-text.html>.
Citrix Systems, Inc., "Managing Cluster Heartbeat Messages," Apr. 20, 2017, <https://docs.citrix.com/en-us/netscaler/12/clustering/cluster-managing/managing-cluster-heartbeat-messages.html>.
Citrix Systems, Inc., "Managing High Availability Heartbeat Messages on a Netscaler Appliance," Jul. 7, 2016, <https://docs.citrix.com/en-us/netscaler/11-1/system/high-availability-introduction/managing-ha-heartbeat-messages.html>.
D. Eastlake 3rd, "Secure Domain Name System Dynamic Update," Apr. 1997, <https://tools.ietf.org/pdf/rfc2137.pdf>.
David Leadbeater, "Wikipedia over DNS," Feb. 28, 2009, <https://dgl.cx/wikipedia-dns>.
Google, "DNS basics," Sep. 7, 2018, <https://support.google.com/a/answer/48090?hl=en#T>.
Google, "Verify your domain for G Suite," Sep. 7, 2018, <https://support.google.com/a/answer/60216>.
Leung, C.T., "Building a Two-Node Linux Cluster with Heartbeat," Mar. 11, 2002, 6 pages, https://www.linuxjournal.com/article/5862.
Mitchell Anicas, "How to Create a High Availability Setup with Heartbeat and Floating IPs on Ubuntu 14.04," Oct. 20, 2015, <https://www.digitalocean.com/community/tutorials/how-to-create-a-high-availability-setup-with-heartbeat-and-floating-ips-on-ubuntu-14-04>.
Ole Michaelis, "Building a distributed eventually consistent key-value store with DNS and Elixir," Dec. 13, 2017, <https://blog.dnsimple.com/2017/12/fun-with-dns/ >.
P. Vixie (Ed.), "Dynamic Updates in the Domain Name System (DNS Update)," Apr. 1997, <https://tools.ietf.org/pdf/rfc2136.pdf>.
VMware, Inc., "Installation on Windows Server 2003 When the Secondary Server is Virtual," 2012, vCenter Server Heartbeat 6.5, <https://www.vmware.com/pdf/vcenter-server-heartbeat-65-installation-windows-2003-virtual-guide.pdf>.
Wikipedia, "Dynamic DNS," Jun. 2, 2108, <https://en.wikipedia.org/w/index.php?title=Dynamic_DNS&oldid=844010565>.

GROUP HEARTBEAT INFORMATION IN A DOMAIN NAME SYSTEM SERVER TEXT RECORD

BACKGROUND

Computing devices, such as servers, storage arrays, and the like, may communicate with one another over one or more computer network(s). In some examples, a computing device may perform various service(s) for the benefit of other computing device(s), manage or coordinate functionalities involving multiple connected computing devices, or the like. In such examples, unavailability of the computing device may have a detrimental effect on the other computing devices.

BRIEF DESCRIPTION OF THE DRAWINGS

The following detailed description references the drawings, wherein.

DETAILED DESCRIPTION

Figure 1:
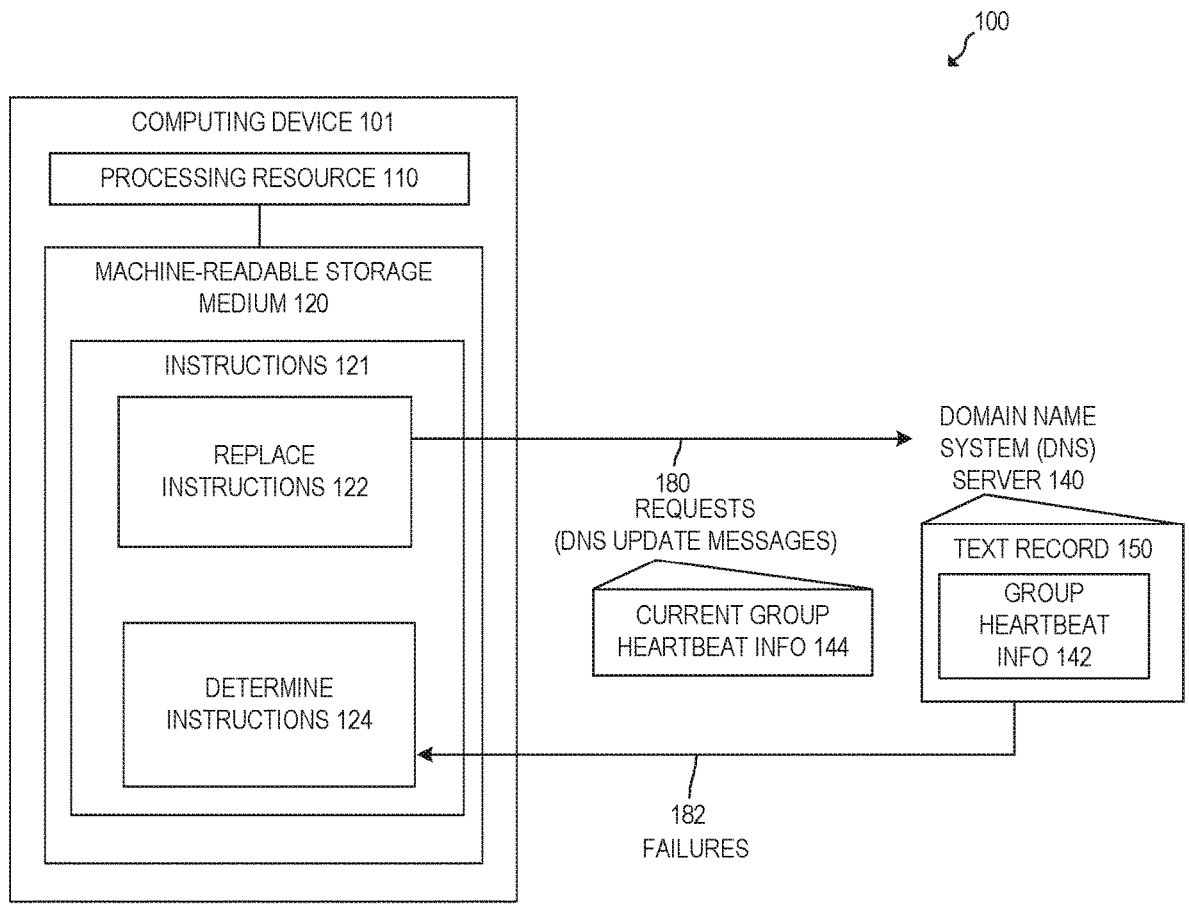
FIG. 1 is a block diagram of an example computing environment including a computing device to request that a Domain Name System (DNS) server replace group heartbeat information stored in a text record of a DNS server.

As noted above, unavailability of a computing device performing services for the benefit of other computing device(s) may have a detrimental effect on the other computing device(s). For example, a plurality of computing devices in communication with one another via computer network(s) may form a "group" (or "cluster") of computing devices that interact with one another to perform certain functionalities, such as data replication as one example. In such examples, one of the computing devices may be a leader of the group, referred to herein as having a "group leader" role. The computing device having the group leader role may perform various functionalities for the group (which may be referred to as "group services" herein), such as management services like, for example, a Representational State Transfer (REST) application programming interface (API) endpoint, a command line interface (CLI) endpoint, or the like.

In some examples, the computing device having the group leader role may also maintain an authoritative record of metadata for the group or cluster (e.g., in a database). For example, when the computing devices include storage arrays in replication relationships to replicate the contents of various volumes to one another, the computing device having the group leader role may maintain an authoritative record of the computing devices (e.g., storage arrays) in the group, information about those computing devices (e.g., internet protocol (IP) addresses, etc.), and information about replication relationships in the group, such as information on each volume stored by the storage arrays and the replication relationships between the volumes of the arrays. For example, this information may specify, for each volume, which storage array owns the upstream (or source) version of the volume, which storage array stores a downstream (or destination) version of the volume (to receive replication of data from the upstream version), what replication pool each volume is assigned to, etc.

In such examples, it may be desirable to promote another computing device of the group to a "backup group leader" role for the group so that the computing device with the backup group leader role (which may be referred to herein as the "backup group leader") may take over the group leader role if the current computing device having the group leader role (which may be referred to herein as the "group leader") experiences issue(s) that may prevent it from successfully performing the group leader role, such as a failure, a loss of communication with other computing device(s), a restart, a shutdown, or the like.

In such examples, a backup group leader may assume the group leader role when it detects such an issue with the group leader (e.g., an apparent failure of the group leader). However, if the group leader has not actually failed, or if the group leader recovers after resolution of a temporary issue, for example, there is potential for a so-called "split brain" situation, in which multiple computing devices may claim to be the group leader. For example, such a split brain situation may occur when an existing group leader (which has not failed or has recovered from a prior issue) claims to be the group leader, and the existing backup group leader (which attempts to assume the group leader role on the assumption that the existing group leader has failed) also claims to be the group leader. Such a split brain scenario may be detrimental, as two different computing devices may assert to have the authoritative view of the information about the group (e.g., about the computing devices and replication relationships, etc.), which may diverge over time, and both may attempt to provide the above-described group services to the group.

In some examples, it may be possible to store group state information, to be used as a "tiebreaker", on one of the computing devices of the group. In such examples, the tiebreaker information may include information about the group, such as an identification of which computing device of the group is to have the group leader role. In such examples, this tiebreaker information may be used to avoid split brain situations where the existing group leader and the backup group leader might otherwise both attempt to assume the group leader role, by indicating to both which computing device among them is permitted to be the group leader at the present time.

However, storing such tiebreaker information on a computing device that is a member of the group may have a major disadvantage, since unavailability (e.g., failure) of the computing device storing the tiebreaker information would also lead to unavailability of the tiebreaker information. Alternatively, storing the tiebreaker information on a separate "witness" (such as another device in the same or a different computing environment) may be inconvenient in some situations. For example, enabling a computing device outside of the group to act as an "active" witness (e.g., able to select a computing device of the group to be the group leader in case of a conflict) or a "passive" witness (e.g., to store the group state or tiebreaker information for use as described above) may involve installing and running custom software (e.g., machine-readable instructions) on a computing device outside of the group. In addition, an appropriate computing device to act as the witness would need to be identified in each computing environment in which such a technique would be used. However, this may be difficult to do in a uniform way across the wide variety of possible computing environments in which the group may be deployed. As such, enabling a computing device outside of the group to act as a witness may complicate deployment of a group of computing devices across different computing environments, as such deployment may involve identifying an appropriate computing device to act as the witness in a particular computing environment, and then installing and running custom software on that computing device.

Using remote computing services outside of the computing environment as the witness (e.g., cloud compute resources, cloud storage resources, etc.) may also pose issues. For example, a particular computing environment may not have access to suitable remote computing services if, for example, resources in the computing environment are prevented from accessing resources outside of their own network, or if the entity (e.g., person, organization, etc.) operating the local computing environment does not have permission to use the remote computing services (e.g., does not have an account). As such, use of remote computing services may also pose complications to the implementation of a group of computing devices that may be deployed in a variety of different computing environments.

In addition, using as a witness (e.g., a passive witness) storage accessible within a given computing environment, but outside of the group of computing devices, may also pose issues in some situations. In many examples, a computing environment with a collection of servers may also have external storage (e.g., storage array(s)) accessible within the same network. In such examples, it may be possible for a group of servers to use, as a witness, external storage (e.g., a storage array) that is in the computing environment but that is not part of the collection of servers that make up the group.

However, in situations where it is the storage arrays of a computing environment that are to act as a group (i.e., with one storage array to act as the group leader to perform various functionalities for the group), then it may be inappropriate to assume that there would be yet another storage array that is within the same computing environment, but outside of the group of storage arrays, that may act as a witness. As such, it may be difficult or inconvenient to establish and use a computing device outside of a group of computing devices as a witness for the group.

To address these issues, examples described herein may utilize a Domain Name System (DNS) server as a witness for a group of computing devices of a computing environment. For example, in examples described herein, a computing device having a group leader role for a group of computing devices may store and periodically update group heartbeat information in a text record of the DNS server (e.g., using DNS update messages). In such examples, a backup group leader may also read the group heartbeat information from the text record of the DNS server. In such examples, the group heartbeat information stored in the DNS text record may be used as tiebreaker information that is stored outside of the group of computing devices (i.e., on a DNS server separate from the computing devices of the group) and that is accessible to computing devices of the group. In some examples, the tiebreaker information may be, for example, an indication of which computing device currently has the group leader role.

It may be advantageous to use the DNS server as a witness, as a DNS server may very often be available and accessible to computing devices of a computing environment, and this may be so across many different types of computing environments. So, for example, a group of storage arrays may utilize a DNS server as a witness, since the DNS server may be implemented by a computing device separate from the storage arrays (and outside of a group formed by the storage arrays), and is likely to be available to the storage arrays in many different computing environments.

In addition, functionalities often provided by DNS servers may be used to store a payload of data in a text record of a DNS server and to retrieve the payload from the DNS server. In such examples, a group may utilize a DNS server as a witness by storing group heartbeat information in the payload of a text record using existing functionalities of the DNS server, and thus without installing and running custom software (e.g., machine-readable instructions) in the DNS server. In addition, a DNS server may have an existing mechanism to replace information in the payload of a text record using an atomic multitransaction. In such examples, a group may utilize this atomic multitransaction mechanism for updating the group heartbeat information in order to avoid race conditions in updating and reading the group heartbeat information (e.g., scenarios in which the timing of update and retrieval operations may lead to a split brain situation).

FIG. 1 is a block diagram of an example computing environment 100 including a computing device 101 to request that a Domain Name System (DNS) server 140 replace group heartbeat information stored in a text record 150 of a DNS server 140. In the example illustrated in FIG. 1, computing device 101 includes at least one processing resource 110 and at least one machine-readable storage medium 120 comprising (e.g., encoded with) at least storage instructions 121 that are executable by the at least one processing resource 110 of computing device 101 to implement functionalities described herein in relation to instructions 121. Instructions 121 may include at least instructions 122 and 124, which may be executable by the at least one processing resource 110.

Computing device 101 may be part of a group of computing devices in which computing device 101 has the group leader role. The group of computing devices may include at least one other computing device, such as a computing device 102 (see FIG. 2), which may have a backup group leader role for at least some of the time that computing device 101 has the group leader role.

In the example of FIG. 1, DNS server 140 may be implemented by a computing device that is separate from computing devices 101 and 102 and that is not in (e.g., not a part of or a participant in) the above-described group of computing devices that includes computing device 101. In some examples the computing devices of the group of computing devices may communicate with one another, and with the computing device implementing DNS server 140, via one or more computer network(s). In examples described herein, a computer network may include, for example, a local area network (LAN), a virtual LAN (VLAN), a wireless local area network (WLAN), a virtual private network (VPN), the Internet, or the like, or a combination thereof. Each of computing devices 101 and 102 may be any suitable type of computing device as described herein, such as a server, a storage array, or the like.

In the example of FIG. 1, computing device 101 may have the group leader role for the group of computing devices. In such examples, instructions 121 may perform group service(s) for the group while it has the group leader role. In examples described herein, a computing device having the group leader role for a group of computing devices may store group heartbeat information for the group in a text record of a DNS server, periodically request that the DNS server replace the group heartbeat information previously stored in the text record with current group heartbeat information for the group. In some examples, this group heartbeat information stored in a text record of a DNS server may be used as tiebreaker information (as described above), and may be used by the group leader to indicate to the backup group leader that it is still available and functioning as the group leader.

In examples described herein, "group heartbeat information" may be information relating to the state of a group of computing devices, as described herein. In examples described herein, group heartbeat information may include information identifying the group (e.g., a group identifier), information identifying the computing device that has the group leader role for the group (e.g., an identifier for the computing device having the group leader role), and information indicating whether the computing device having the backup group leader role is synchronized with the computing device having the group leader role (e.g., a synchronization state, such as in-sync or out-of-sync). In examples described herein, each piece of information in the group heartbeat information may be represented in any suitable form or format (e.g., a numeric value, an alphanumeric value, or the like).

In examples described herein, different versions of group heartbeat information may be stored in text record 150 of DNS server 250 over time (with different versions containing different information). For example, when a synchronization state of the group changes (e.g., the backup group leader is brought into synchronization with the group leader), previously stored version of group heartbeat information (indicating a synchronization state of "out-of-sync") may be replaced with a new version of the group heartbeat information (indicating a synchronization state of "in-sync") in text record 150. When a group leader of the group changes (e.g., the backup group leader assumes the group leader role), the previously stored version of group heartbeat information (identifying a first computing device as the group leader) may be replaced with a new version of the group heartbeat information (identifying a second computing device as the group leader) in text record 150.

In examples described herein, the group leader may replace the group heartbeat information stored in the text record 150 at periodic intervals to indicate that it is present and functioning as the group leader (e.g., based on a heartbeat interval specified for the group of computing devices, as described below). In such examples, the group leader may replace the group heartbeat information 142 stored in text record 150 (e.g., previously stored in text record 150 by the current or a previous group leader) with current group heartbeat information 144 for the current group leader. In examples described herein, "current" group heartbeat information for a given computing device of a group of computing devices may be group heartbeat information that represents aspect(s) of the state of the group according to the given computing device at the time that the group heartbeat information is provided by the given computing device (e.g., at a "current" time).

For example, when a given computing device having the group leader role replaces group heartbeat information 142 stored in text record 150 with current group heartbeat information 144 for the given computing device, the current group heartbeat information 144 may represent aspect(s) of the state of the group according to the given computing device at the time that the group heartbeat information is provided by the given computing device at the current time (e.g., identification of the group leader and the synchronization state according to the given computing device at the current time). For ease of illustration and explanation, reference numeral "142" is used to indicate group heartbeat information stored in text record 150 and that is to be replaced, and reference numeral "144" is used to indicate current group heartbeat information to replace presently stored group heartbeat information 142. In examples explained here, it may be understood that once an instance of current group heartbeat information 144 replaces an instance of group heartbeat information 142 stored in text record 150, the replacement current group heartbeat information 144 may thereafter be considered group heartbeat information 142 stored in text record 150 and that is to be replaced by a next instance of current group heartbeat information 144.

In examples described herein, the group heartbeat information may not change each time it is replaced, as there may not be any change in the group leader, synchronization state, etc., between successive intervals at which the group heartbeat information is replaced. As such, in some examples, successive instances of current group heartbeat information 144 may be the same, and an instance of current group heartbeat information 144 that replaces an instance of group heartbeat information 142 stored in text record 150 may be the same.

In examples described herein, an update indicator may be used to distinguish between successive instances of group heartbeat information. In examples described herein, an "update indicator" may be information that a group leader changes at a DNS server each time it replaces the group heartbeat information stored in a text record of the DNS server. In such examples, a backup group leader may retrieve the update indicator from the DNS server at successive times to determine whether the group leader is active and updating the group heartbeat information, and if not, may determine that the group leader has become unavailable. In some examples, the update indicator may be a sequence number, and an incremented value of the sequence number may be stored on the DNS server each time current group heartbeat information replaces previously stored group heartbeat information in the text record of the DNS server. In other examples, the update indicator may have any other suitable form or format, and may be successively changed in any other suitable manner. In some examples, the update indicator may be stored in the same text record of the DNS server as the group heartbeat information, or may be stored elsewhere on the DNS server (e.g., another record of the DNS server).

In examples described herein, the group leader may replace the update indicator stored on the DNS server each time it replaces the group heartbeat information stored in the text record of the DNS server. However, unlike the group heartbeat information, whose content may not change between successive instances, a group leader is to replace the update indicator stored on the DNS server with a different update indicator (e.g., an incremented update indicator in the case of a sequence number) each time it replaces the group heartbeat information in the text record of the DNS server. In examples described herein, a "current" update indicator for group heartbeat information may be a version or instance of the update indicator that is different than, and that is to replace, the update indicator presently stored on the DNS server for the group heartbeat information. For ease of illustration and explanation, reference numeral "146" is used to designate an update indicator presently stored on a DNS server for group heartbeat information 142 stored in text record 150 of the DNS server (and that is to be replaced), and reference numeral "148" is used to designate a current update indicator to replace the presently stored update indicator 146 when group heartbeat information 142 is replaced at the DNS server. In examples explained here, it may be understood that once a current update indicator 148 replaces an update indicator 146 stored on the DNS server, the replacement update indicator 148 be considered as the update indicator 146 stored on the DNS server.

In examples described herein, a text record 150 of a DNS server may include a record name (usable as a key, index, or the like, to access text record 150), a record type 154 (which for text record 150 may be a type "TXT" indicating a text record), and a payload 156 (e.g., 156 of FIG. 2) in which information may be stored, such as group heartbeat information 142 and an update indicator 146.

In examples described herein, while computing device 101 has the group leader role, instructions 122 may periodically request 180 that DNS server 140 replace the group heartbeat information 142 stored in text record 150 of DNS server 140 with current group heartbeat information 144 of computing device 101 (i.e., current at the time of the request 180). In such examples, while computing device 101 has the group leader role, instructions 122 may request 180 that DNS server 140 replace the group heartbeat information 142 stored in text record 150 with current group heartbeat information 144 periodically according to any suitable fixed or variable rate, interval, or the like, which may be specified by a heartbeat interval for the group of computing devices. For example, in examples described herein, a group of computing devices may have a specified heartbeat interval that indicates an amount of time that the group leader is to wait, after requesting 180 replacement the group heartbeat information 142 in text record 150, before again requesting 180 replacement of group heartbeat information 142 in text record 150.

In such examples, while computing device 101 has the group leader role, instructions 122 may periodically request 180 that DNS server 140 replace the group heartbeat information 142 stored in text record 150 with current group heartbeat information 144 at a rate that is defined by the heartbeat interval for the group. In such examples, the heartbeat interval may specify the rate according to an amount of time to wait between requests to replace the group heartbeat information 142. In some examples, the heartbeat interval may specify the rate according to an amount of time on the order of minute(s) (e.g., once every 1 minute, once every 10 minutes, once every 20 minutes, once every hour, or the like). In other examples, the heartbeat interval may specify any other suitable fixed or variable amount of time or rate. The heartbeat interval may be a configurable parameter for the group of computing devices. In some examples, instructions 122 may store a time to live (TTL) parameter on the DNS server 140 for the group heartbeat information that it stores on the DNS server. In such examples, the TTL parameter may be an amount of time that is greater than an amount of time specified by the heartbeat interval (e.g., to allow for network issues that may delay retrieval of the group heartbeat information from the DNS server 140).

In the example illustrated in FIG. 1, while computing device 101 has the group leader role, instructions 122 may request 180 that DNS server 140 replace the group heartbeat information 142 stored in text record 150 with current group heartbeat information 144 at a plurality of different (e.g., successive) times based on the rate specified by the heartbeat interval (e.g., at different times that are separated based on the amount of time specified by the heartbeat interval). In such examples, at each of the plurality of different times while computing device 101 has the group leader role, instructions 122 may request 180 that DNS server 140 replace group heartbeat information 142, stored in a text record 150 of a DNS server 140, with current group heartbeat information 144 of computing device 101. In such examples, the current group heartbeat information 144 of computing device 101 may indicate that computing device 101 has the group leader role for the group (since computing device 101 has the group leader role at the time of the attempt). In such examples, at each of the different times, the current heartbeat information 144 may represent aspect(s) of the state of the group of computing devices according to computing device 101 at the time of the request 180 (i.e., the current time).

In some examples, instructions 122 may request 180 that DNS server 140 replace group heartbeat information 142 (and an update indicator) with current group heartbeat information 144 (and a current update indicator) on DNS server 140 using a DNS update message 180. In examples described herein, a "DNS update message" may be a message that requests that a DNS server replace information in a record stored on the DNS server. In such examples, each use of a DNS update message may be considered an "attempt" to replace information stored on a DNS server, as the requested replacement may be unsuccessful, as described herein. A DNS update message may be in a form or format that the DNS server is able to parse such that the DNS server is able to perform the request. In examples described herein, a DNS update message may include the information (e.g., current group heartbeat information 144 and current update indicator 148) that is to replace information currently stored in a record of the DNS server (e.g., group heartbeat information 142 and an update indicator stored on the DNS server) according to the request. In some examples, the DNS update message may be implemented as an "UPDATE" message as in any of the examples described in "Dynamic Updates in the Domain Name System (DNS UPDATE)," P. Vixie, Ed., Network Working Group, Request for Comments: 2136, April 1997 (hereinafter, "RFC 2136"). In some examples, each request 180 may be a request for DNS server 140 to perform an atomic multitransaction (as described below) to replace group heartbeat information 142 with current group heartbeat information 144 (and, in some examples, to replace an update indicator stored on DNS server 140 with a current update indicator 148, as described below).

In some examples, computing device 101 may receive a response to each request 180 that the DNS server replace information at the DNS server 140 (e.g., each DNS update message 180 that it transmits to DNS server 140). For example, when a given request 180 is successful at DNS server 140 (i.e., DNS server 140 has successfully made the replacement requested), computing device 101 may receive a response, from DNS server 140, indicating that the request was completed successfully (e.g., that the DNS update message 180 was successful). In some examples, when a given request 180 reaches DNS server 140 but fails (due to the DNS server 140 failing to successfully make the requested replacement, for example), then computing device 101 may receive a failure response 182 from DNS server 140 (e.g., an error response) indicating that the request 180 failed (e.g., the DNS update message 180 failed). In some examples, when a given a given request 180 fails to reach DNS server 140 (e.g., due to network issues, or the like), then computing device 101 may receive a failure response 182 (e.g., an error response) indicating that the given request 180 (e.g., a DNS update message 180) failed to reach DNS server 140.

In the example of FIG. 1, while computing device 101 has the group leader role, instructions 124 may track failed requests 180 (e.g., failed DNS update messages 180). In some examples, instructions 124 may track the failed requests 180 based on the responses 182 computing device 101 receives to its requests 180 to the DNS server 140. In such examples, instructions 124 may determine whether a threshold number of the requests 180 (e.g., DNS update messages 180) it has sent to DNS server 140 have failed. In some examples, based on a determination, by instructions 124, that the threshold number of the DNS update messages 180 sent have failed, instructions 124 may cause computing device 101 to cease performance of the group leader role for the group. In some examples, ceasing performance of the group leader role for the group may include instructions 124 causing the first computing device to cease attempting to replace the group heartbeat information 142 stored in text record 150 of DNS server 140 (e.g., cease requesting 180 that DNS server 140 replace the group heartbeat information 142 stored in text record 150 of DNS server 140). In some examples, ceasing performance of the group leader role may include instructions 122 ceasing to perform the group service(s) for the group of computing devices. In examples described herein, the threshold number of failed requests (for triggering the group leader to cease performing the group leader role) may be any suitable number greater than zero (e.g., 1, 10, etc.).

In some examples, instructions 124 may determine whether a threshold number of consecutive requests 180 from computing device 101 (to DNS server 140) have failed. In such examples, instructions 124 may cause computing device 101 to cease performance of the group leader role (including ceasing attempts to replace the group heartbeat information 142 stored in text record 150) based on a determination that the threshold number of consecutive requests 180, sent by computing device 101 to DNS server 140, have failed.

In examples described herein, a computing device 101 having the group leader role may determine to cease performance of the group leader role after detecting a threshold number of failure(s) to replace the group heartbeat information at the DNS server, since such failure(s) may indicate an issue such as another computing device having taken over the group leader role or a communication failure. In such examples, a computing device having the group leader role, but failing to replace the group heartbeat information, may cease attempting to replace the group heartbeat information to enable or allow another computing device of the group (e.g., the backup group leader, as described below) to take over the group leader role. In some examples, functionalities described herein in relation to FIG. 1 may be provided in combination with functionalities described herein in relation to any of FIGS. 2-5.

Figure 2:
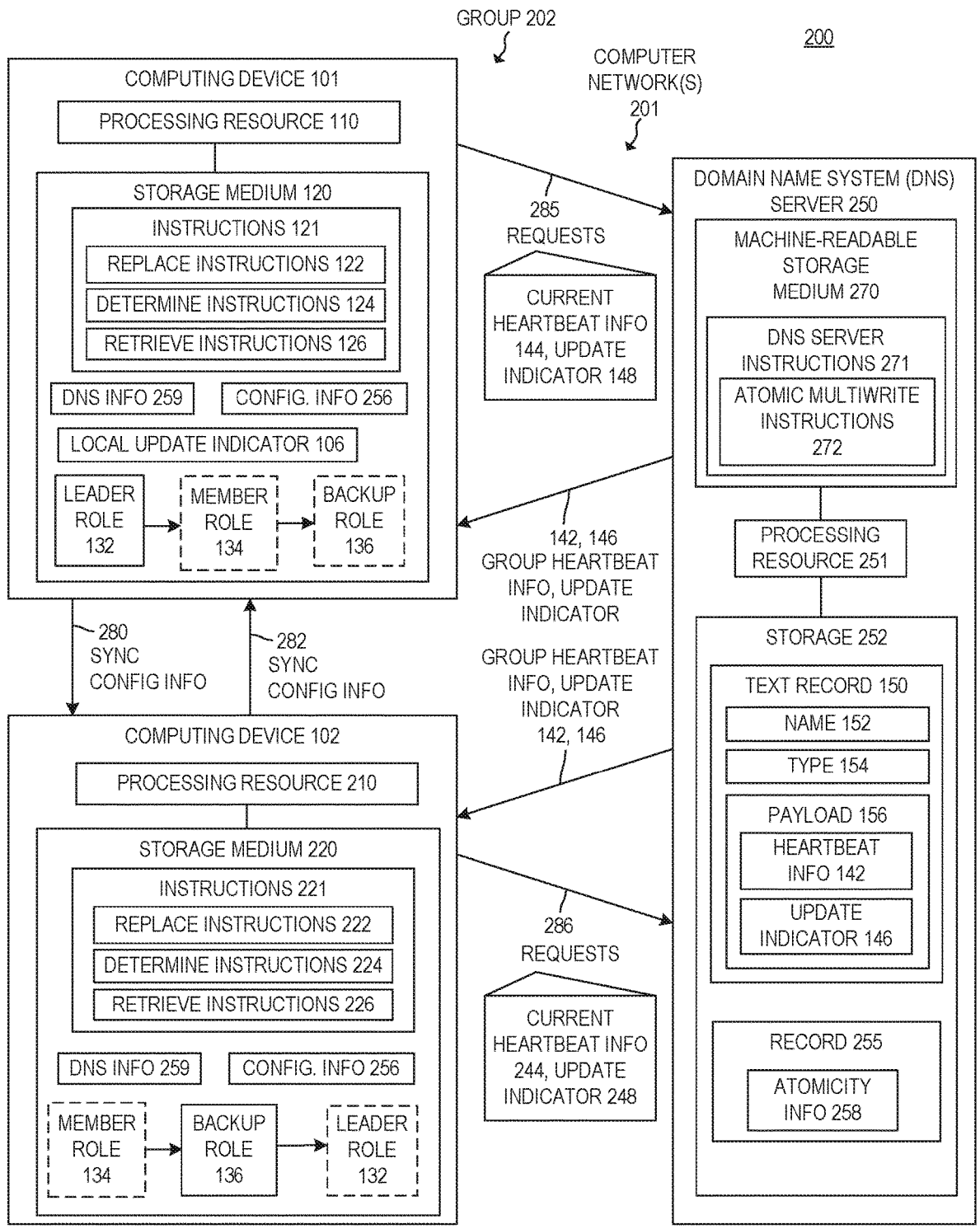
FIG. 2 is a block diagram of an example computing environment including one computing device to attempt to request replacement of group heartbeat information in a DNS server and another computing device to retrieve group heartbeat information from the DNS server.

FIG. 2 is a block diagram of an example computing environment 200 including a computing device to request replacement of group heartbeat information in a DNS server and another computing device to retrieve group heartbeat information from the DNS server. The example illustrated in FIG. 2 is different than the example illustrated in FIG. 1, but for ease of illustration, the example illustrated in FIG. 2 expands on the example illustrated in FIG. 1 and described above. However, the examples described in relation to FIG. 2 are not be construed as limiting the examples described above in relation to FIG. 1.

The example illustrated in FIG. 2 includes a computing environment 200 including a DNS server 250, and a group of computing devices 202 (which may be referred to herein as "group 202"). Group 202 may include at least computing device 101 (described above) and a computing device 102. In other examples, group 202 may include more or different computing devices. In the example of FIG. 2, group 202 does not include the computing device implementing DNS server 250. The computing devices of group 202 may interact with one another to perform certain functionalities, and a group leader for group 202 may perform group service(s) for the group, as described above. The computing devices of group 202 may communicate with one another and with DNS server 250 via one or more computer network (s) 201.

In the example illustrated in FIG. 2, computing device 101 comprises processing resource 110, storage medium 120, and instructions 121, as described above. In the example illustrated in FIG. 2, instructions 121 include at least instructions 126 in addition to instructions 122 and 124 described above. In the example illustrated in FIG. 2, computing device 101 may include configuration information 256 and a local update indicator 106, which may be stored on storage medium 120 or any other machine-readable storage medium of computing device 101. In the example illustrated in FIG. 2, computing device 102 comprises a processing resource 210, a machine-readable storage medium 220, and instructions 221, which include at least instructions 222, 224, and 226. In the example of FIG. 2, instructions 222, 224, and 226 may perform any of the functionalities described herein in relation to instructions 122, 124, and 126, respectively. In some examples, computing devices 101 and 102 may both be storage arrays.

In the example illustrated in FIG. 2, DNS server 250 may be a computing device (e.g., a server) comprising a processing resource 251 and a machine-readable storage medium 270. DNS server 250 may also include storage 252, which may be implemented by any combination of at least one machine-readable storage medium. In some examples, storage medium 270 may not be separate from storage 252. Although in the example of FIG. 2, DNS server 250 is illustrated as a physical server, in other examples DNS server 250 may implemented as a virtual server, such as a DNS server running in a virtual machine (VM), or a DNS server running on remote computing services such as on cloud computing resources (e.g., cloud compute resources, etc.). In some examples, computing devices 101 and 102 of group 202 are both storage arrays, and DNS server 250 is implemented by a computing device that is not in group 202 and that is a computing device other than a storage array (e.g., a server).

In the example of FIG. 2, DNS server 250 may include instructions 271 to implement the functionalities described herein in relation to DNS server 250, such as storing a plurality of records (or "resource records") on DNS server 250. Such records stored on DNS server 250 may be referred to as "DNS records" herein. For example, instructions 271 may store a plurality of DNS records in storage 252 of DNS server 250, including a text record 150 and another record 255, for example. DNS server instructions 271 may include instructions 272 executable by processing resource 251 to perform the functionalities described herein in relation to instructions 272.

In examples described herein, each DNS record may include a record name usable (as a key, index, or the like) to access the text record, may include a record type to indicate the type of the DNS record, and may include a payload in which other information may be stored. In the example of FIG. 2, text record 150 may include a record name 152 usable to access text record 150, a record type 154 (which for text record 150 may be a type "TXT" indicating a text record), and a payload 156 in which information such as group heartbeat information 142 and an update indicator 146 may be stored.

In the example illustrated in FIG. 2, instructions 121 may perform the formation of group 202, and may cause computing device 101 to assume the group leader role 132 for group 202 (see solid box 132 in computing device 101). An indication of the role of computing device 101 in group 202 may be stored in storage medium 120 or elsewhere on computing device 101. Instructions 221 may cause computing device 102 to join group 202 in a member role 134 (see dotted box 134 in computing device 102), which may be the role held by any computing device that is not either the group leader or the backup group leader. An indication of the role of computing device 102 in group 202 may be stored in storage medium 202 or elsewhere on computing device 102. In examples described herein, instructions 121 and 221 may create and join group 202 in any suitable manner (e.g., in response to manually input instructions and information, based on configuration files stored on computing devices 101 and 102, or programmatically based on a bootstrapping procedure, etc.).

In the example illustrated in FIG. 2, computing devices 101 and 102 may each store DNS information 259 (e.g., in a respective machine-readable storage medium thereof). DNS information 259 may be information useable by instructions 121 and 221 to utilize DNS server 250 for storing and retrieving group heartbeat information as described here. For example, DNS information 259 may indicate any of, for example, an Internet Protocol (IP) address of DNS server 250, a heartbeat interval (e.g., how often the group leader is to update the group heartbeat information on DNS server 250), authentication information for DNS server 250, a host name for one of the computing devices 101 and 102, a heartbeat interval for the group 202, or the like. DNS information 259 may be provided to or obtained by computing devices 101 and 102 in any suitable way, and different pieces of DNS information 259 may be provided or obtained in different ways. For example, pieces of DNS information 259 may be provided in configuration files stored on computing devices 101 and 102, provided from one computing device to another, retrieved from DNS server 250, constructed based on other pieces of provided or obtained DNS information 259, or the like.

After computing device 101 assumes and begins performing the group leader role 132, instructions 121 may start a plurality of group services for group 202. Among the plurality of group services, instructions 121 may implement one or more of, for example, a REST API endpoint, a CLI endpoint, an Internet Small Computer Systems Interface (iSCSI) discovery endpoint, a GUI web server, a simple network management protocol daemon (SNMPD), a database, or the like. In some examples, group configuration information 256 may hold an authoritative record of the computing devices (e.g., storage arrays) in the group 202, information about those computing devices (e.g., IP addresses, etc.), and relationships among the computing devices (e.g., replication relationships, etc.). In some examples, group configuration information 256 may be implemented as a database.

In some examples, the computing devices of the group 202 may be respective storage arrays that implement replication of volumes between them. In such examples, group configuration information 256 may, as described above, include information about replication relationships in the group, such as information on each volume stored by the storage arrays and the replication relationships between the volumes of the arrays. For example, this information may specify, for each volume, which storage array owns the upstream (or source) version of the volume, which storage array stores a downstream (or destination) version of the volume (to receive replication of data from the upstream version), what replication pool each volume is assigned to, and the like.

In the example illustrated in FIG. 2, after computing device 101 has assumed the group leader role 132, instructions 121 may cause computing device 101 to promote computing device 102 to a backup group leader role 136 (see solid box 136 in computing device 102). Instructions 221 may then assume and start performing the backup group leader role 136 for group 202. In such examples, instructions 121 then may begin to synchronize 280 group configuration information 256 to computing device 102. For example, instructions 121 may provide group configuration information 256 to computing device 102, and instructions 221 may acquire group configuration information 256 from computing device 101 and store a copy on computing device 102 (e.g., on storage medium 220 or elsewhere).

In such examples, instructions 121 may keep the group configuration information 256 stored on computing device 102 in synchronization with group configuration information 256 stored on computing device 102 while computing device 101 has the group leader role 132 and while computing device 102 has the backup group leader role 136. In such examples, when configuration information 256 stored on computing device 101 differs from configuration information 256 stored on computing device 102, the backup group leader 102 may be considered "out-of-sync" with the group leader, and when configuration information 256 stored on computing device 101 is the same as configuration information 256 stored on computing device 102, the backup group leader 102 may be considered to be "in-sync" with the group leader.

Figure 3:
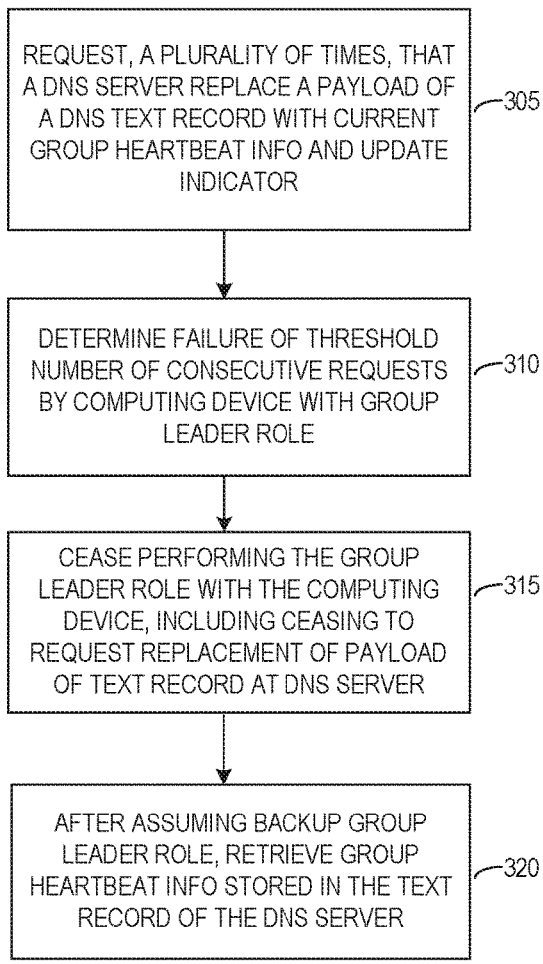
FIG. 3 is a flowchart of an example method that includes requesting a DNS server to replace a payload of a text record with current group heartbeat information.

An example of a group leader storing current group heartbeat information in a text record of a DNS server is described below in relation to FIGS. 2 and 3. FIG. 3 is a flowchart of an example method 300 that includes requesting a DNS server to replace a payload of a text record with current group heartbeat information. Although execution of method 300 is described below with reference to computing device 101 of FIG. 2, other computing devices suitable for the execution of method 300 may be utilized (e.g., computing device 102 of FIG. 2). Additionally, implementation of method 300 is not limited to such examples.

As described above, in some examples, group heartbeat information (e.g., 142, 144, etc.) may include information identifying the group 202 (e.g., a group identifier), information identifying the computing device that has the group leader role for the group (e.g., an identifier for the computing device having the group leader role), and information indicating whether the computing device having the backup group leader role is synchronized with the computing device having the group leader role (e.g., a synchronization state, such as in-sync or out-of-sync).

While computing device 101 has the group leader role 132, instructions 122 of computing device 101 may periodically (e.g., based on the rate specified by the heartbeat interval for group 202) request that DNS server 250 replace the group heartbeat information 142 stored in text record 150 of DNS server 250 with current group heartbeat information 144 of computing device 101 (i.e., current at the time of the request), as described above in relation to the example of FIG. 1 (e.g., for DNS server 140). In such examples, at 305 of method 300, instructions 122 may, at each of a plurality of different times while computing device 101 is performing group leader role 132 for the group 202 (e.g., based on the rate specified by the heartbeat interval for group 202), request 285 that DNS server 250 replace a payload 156 of text record 150 of DNS server 250 with current group heartbeat information 144 of computing device 101 and a current update indicator 148 for the current group heartbeat information 144.

In some examples, instructions 122 may store a time to live (TTL) parameter on the DNS server 250 for the group heartbeat information that it stores on DNS server 250. In such examples, the TTL parameter may be an amount of time that is greater than an amount of time specified by the heartbeat interval (e.g., to allow for network issues that may delay retrieval of the group heartbeat information from the DNS server 250). In some examples, each request 285 may specify the name 152 of text record 150, whose payload 156 is requested to be replaced. In some examples, the name 152 of text record 150 may be a hostname assigned to text record 150 on DNS server 150, wherein the hostname includes a domain name associated with DNS server 150. For example, a domain name associated with DNS server 150 may be in the form of a Uniform Resource Locator (URL) (e.g., "exampledssserver.com"), and the hostname 152 associated with text record 150 may be also be in the form of a URL including the domain name (e.g., such as "host1.exampledssserver.com"). In such examples, each request 285 may specify name 152, to indicate to DNS server 250, which text record payload the request 285 is requesting to replace. In other examples, the name 152 of text record 150 may be specified in any other suitable manner.

In some examples, each request 285 may specify current group heartbeat information 144 and a current update indicator 148 for current group heartbeat information 144. In some examples, each instance of current group heartbeat information 144 provided by computing device 101 may indicate that computing device 101 has the group leader role 132 for the group 202. In such examples, the current group heartbeat information 144 may include an identifier for computing device 101 as the information identifying the computing device having the group leader role 132. In some examples, each instance of current group heartbeat information 144 provided by computing device 101 may identify group 202 (as described above), and may indicate a synchronization state for the backup group leader. For example, the current group heartbeat information 144 may indicate an "out-of-sync" synchronization state when the synchronization of the configuration information 256 from the group leader (e.g., computing device 101) to the backup group leader (e.g., computing device 102) is not complete (e.g., when the configuration information 256 stored at the backup group leader is out-of-sync with the configuration information 256 stored at the group leader). The current group heartbeat information 144 may indicate an "in-sync" synchronization state when the synchronization of the configuration information 256 from the group leader to the backup group leader is complete (e.g., the configuration information 256 stored at the backup group leader is in-sync with the configuration information 256 stored at the group leader).

In some examples, each request 285 may request replacement of group heartbeat information 142 stored in text record 150 of DNS server 250 with current group heartbeat information 144, and request replacement of update indicator 146 stored on DNS server 250 with a current update indicator 148 for current group heartbeat information 144 that is different than update indicator 146. In such examples, a backup group leader may periodically retrieve the group heartbeat information 142 and update indicator 146 stored on DNS server 250 at the time of the request, and may determine from the retrieved update indicators 146 whether the group leader is actively replacing the group heartbeat information and update indicator for group 202 on DNS server 250 and use this information to determine whether to take over as group leader when a threshold amount of time has passed since the group leader has replaced the group heartbeat information and update indicator (e.g., when the group heartbeat information and update indicator have been retrieved a threshold number of times without having been changed by the group leader).

In some examples, an update indicator may be a sequence number and instructions 122 may increment the sequence number for each time it requests replacement of the group heartbeat information at DNS server 250. In such examples, each instance of current update indicator 148 is an incremented version of the sequence number stored on DNS server 250 as the update indicator 146. For example, at a given time, an update indicator 146 stored on DNS server 250 may be a sequence number having a value of "55", a next request 285 from instructions 122 may request replacement of update indicator 146 with a current update indicator 148 having a value of "56", and the next request 285 including a current update indicator 148 having a value of "57", etc. In other examples, update indicators may take any other suitable form or format, and may be changed (e.g., incremented) in any suitable manner, such that each time the update indicator is replaced on DNS server 250, it is replaced with a value that has not been used previously for the update indicator of group 202 (e.g., since formation of group 202, for example). In some examples, the update indicator may be monotonically increasing. In some examples, update indicators 146 may be stored in the payload 156 of the text record 150 with the group heartbeat information 142, as illustrated in the example illustrated in FIG. 2. In other examples, update indicator 146 may be stored in a separate record of DNS server 250 from the text record 150 in which group heartbeat information 142 is stored.

In some examples, each request 285 may be a request for DNS server 250 to perform an atomic multitransaction to replace group heartbeat information 142 and update indicator 146 with current group heartbeat information 144 and a current update indicator 148. In some examples, each request 285 be a DNS update message 285, as described above in relation to FIG. 1. In some examples, each DNS update message 285 may be a request for DNS server 250 to perform an atomic multitransaction to replace group heartbeat information 142 and update indicator 146 with current group heartbeat information 144 and a current update indicator 148. In examples described herein, atomic multitransactions may involve atomicity information. In some examples, atomicity information 258 may be stored in record 255 on DNS server 250. In some examples, record 255 may have a name (such as a hostname, as described above for record 150), a type (e.g., Start of Authority ("SOA")), and a payload where atomicity information 258 may be stored.

In examples in which each request 285 is a request to perform an atomic multitransaction at DNS server 250, the request 285 may include expected atomicity information provided in request 285 by instructions 122 (of the group leader), and which atomicity information 258 is to match in order for the atomic multitransaction to complete successfully. In such examples, in response to the request 285, instructions 272 of DNS server 250 may perform an atomic multitransaction process that includes: (1) comparing the expected atomicity information provided in request 285 to the atomicity information 258 stored in record 255 of DNS server 205; and when the atomicity information 258 matches the expected atomicity information, then (2) replacing the atomicity information 258 with different atomicity information in record 255 and, after replacing the atomicity information 258, (3) replacing group heartbeat information 142 and update indicator 146 on DNS server 250 (e.g., in text record 150) with current group heartbeat information 144 and a current update indicator 148 provided in request 285. In such examples, when performing the atomic multitransaction process, when the atomicity information 258 does not match the expected atomicity information (i.e., at (1) the information does not match), then the atomic multitransaction (and request 285) fails (i.e., (2) and (3) are not performed). In such examples, a requested atomic multitransaction is to fail when expected atomicity information (e.g., included in the request) does not match atomicity information that is stored on the DNS server.

In examples described herein, instructions 227 may implement the atomic multitransaction that success of the atomic multitransaction indicates that the atomicity information 258, the group heartbeat information 142, and update information 146 were replaced by that atomic multitransaction, and none of those pieces of information (258, 142, and 146) were replaced by any other transaction (e.g., from another computing device) during the execution of the atomic multitransaction. For example, performance of an atomic multitransaction by instructions 272 may provide that, when the atomicity information matches at (1) (described above), then replacements of both (2) and (3) (described above) are performed. In such examples, success of an atomic multitransaction (e.g., success of a request 285) may indicate that the provided atomicity information matched at (1), and the replacements of (2) and (3) were both performed. When the atomicity information does not match at (1), instructions 272 will perform neither of the replacements of (2) and (3). In such examples, either the replacements of (2) and (3) are both performed (when there is a match at (1)), or neither of the replacements of (2) and (3) are performed (when there is not a match at (1)). In some examples, when two or more competing requests for atomic multitransactions on the same data are provided near one another in time, such requests may include the same expected atomicity information that matches the atomicity information 258 stored on DNS server 250. However, since execution of an atomic multitransaction includes replacement of the atomicity information 258 with a different value at (2), just one of the requests with the same expected atomicity information will succeed, as the other such request (s) executed after the successful one will fail, since their expected atomicity information will not match the atomicity information 258 stored on DNS server, which was changed by the successful request (i.e., successful atomic multitransaction). Instructions 272 may provide this behavior by processing received atomic multitransactions serially, and not concurrently. In some examples, the DNS server 250 may perform the atomic multitransaction as described in Section 5.7 of RFC 2136. In some examples, atomicity information may be implemented as a sequence number, and the atomicity information may be replaced with an incremented sequence number each time it is replaced as part of an atomic multitransaction. For example, at a given time, atomicity information 258 stored on DNS server 250 may be a sequence number having a value of "23", a next request 285 from instructions 122 may request an atomic multitransaction to replace group heartbeat information 142 and update indicator 146, and include expected atomicity information having a value of "23". In such examples, the atomic multitransaction may succeed at DNS server 250, and part of the atomic multitransaction process may be to replace atomicity information 258 in record 255 with different atomicity information having a value of "24". In such examples, if the expected atomicity information were a sequence number with a value of "22", then the comparison would determine that the expected atomicity information ("22") and the stored atomicity information 258 ("23") do not match (e.g., are not identical) and the atomic multitransaction would therefore fail. In such examples, another computing device of group 202 may have replaced the group heartbeat information 142 (thus incrementing the atomicity information 258) before computing device 101 was able to replace it using request 285. As such, computing device 101 is not able to make the replacement. In some examples, the atomicity information may be monotonically increasing. In other examples, the atomicity information may take any other suitable form or format, and a later version of the atomicity information may differ from the prior version of the atomicity information in any suitable manner. In some examples, each of the requests 285 may be a request that DNS server 250 use an atomic multitransaction to replace the payload 156 of text record 150 of DNS server 250 with current group heartbeat information 144 of computing device 101 and a current update indicator 148 for the current group heartbeat information 144.

In the example of FIG. 2, computing device 101 may receive a response to each request 285 to replace the payload 156 of the text record 150, such as a "success" response indicating that the requested replacement was made successfully or an "error" response indicating failure of the request (i.e., that the requested replacement was not made). In such examples, instructions 124 may determine whether a threshold number of the requests 285 made by computing device 101 have failed. In such examples, at 310, instructions 124 may determine that a threshold number of the requests 285 have failed. In some examples, the determination may be that a threshold number of DNS update messages 285 have failed. In some examples, the determination at 310 may be that a threshold number of consecutive requests 285 have failed (e.g., a threshold number of DNS update messages have failed consecutively). As noted above, the threshold number may be any suitable number greater than zero (e.g., 1, 10, etc.)

Based on the determination at 310, instructions 124 may, at 315, cause computing device 101 to cease performance of group leader role 132. In some examples, as part of causing computing device 101 to cease performance of group leader role 132, instructions 124 may cause computing device 101 to cease sending requests 285 (e.g., DNS update messages) attempting to replace the group heartbeat information 142 stored in text record 150 of DNS server 250, and may cause computing device 101 to cease performing the group service(s) described above for group 202.

In some examples, based on the determination at 310, instructions 124 may cause computing device 101 to assume a group member role 134 in group 202. In some examples, computing device 101 may wait for a period of time after assuming the group member role 134 and then retrieve the group heartbeat information 142 stored in text record 150 at that time to check whether another computing device of group 202 has assumed the group leader role. If so, then computing device 101 may remain in the group member role 134, and if not, then computing device 101 may assume the group leader role 132 again (e.g., via a multi-stage process in which instructions 122 may cause computing device 101 to enter a state in which computing device 101 is to become the group leader by replacing the group heartbeat information, as described herein, and subsequently assume the group leader role 132 and replace the group heartbeat information 142 with current group heartbeat information 144 indicating that computing device 101 has the group leader role 132). In such examples, when a transient event, such as computer network issues, cause the failures that lead to the group leader surrendering the group leader role, the group leader may resume the group leader role if those issues are resolved and no other computing device has assumed the group leader role in the period of time that the computing device waits after assuming the group member role.

For example, at a given time that is at least a threshold amount of time after computing device 101 assumed the member role 134 ("member threshold" herein), instructions 126 may retrieve the group heartbeat information 142 stored in text record 150 at the given time (i.e., stored at the time of the retrieval). Instructions 126 may then determine whether, in the retrieved group heartbeat information 142, computing device 101 is identified as having the group leader role 132 (i.e., identified as the group leader). In some examples, the member threshold amount of time may be based on at least one of the heartbeat interval for group 202 and the threshold number for the failed requests. For example, the threshold number of failed requests may be 10, and in such examples, instructions 124 may cause computing device 101 to cease performance of group leader role 132 and assume a group member role 134 after 10 (consecutive) failed requests 285. In such examples, the member threshold amount of time to wait after assuming the member role may be an amount of time that based on twice the amount of time for a computing device to reach the threshold number of failures (e.g., 20 times the heartbeat interval, or the like).

In some examples, at a given time that is at least the member threshold amount of time after computing device 101 assumed the member role 134 (e.g., 20 times the heartbeat interval), instructions 126 may retrieve the group heartbeat information 142 stored in text record 150 at the given time (i.e., stored at the time of the retrieval). In such examples, based on a determination that, in the retrieved group heartbeat information 142, computing device 101 is indicated as having the group leader role, instructions 122 may cause computing device 101 to assume the group leader role 132 again (as another computing device of group 202 has not assumed the group leader role for group 202).

Based on a determination that a computing device other than computing device 101 is indicated as having the group leader role in the group heartbeat information 142 retrieved after the member threshold amount of time, then computing device 101 may remain in the group member role 134 and instructions 122 do not cause computing device 101 to assume the group leader role 132 again. In such examples, backup group leader computing device 102 may have assumed the group leader role 132, and may have written the retrieved group heartbeat information 142, which may indicate in such examples that computing device 102 is has the group leader role 132. In such examples, after computing device 102 has assumed the group leader role 132 (as described in more detail below), instructions 221 of computing device 102 may promote computing device 101 from group member role 134 to the backup group leader role 136.

In the example illustrated in FIG. 2, after computing device 102 has assumed the group leader role 132, instructions 221 may cause computing device 102 to promote computing device 101 to the backup group leader role 136 (see dotted box 136 in computing device 101). Instructions 121 may then assume and start performing the backup group leader role 136 for group 202. In such examples, instructions 221 then may begin to synchronize 282 group configuration information 256 to computing device 101. For example, instructions 221 may provide group configuration information 256 to computing device 101, and instructions 121 may acquire group configuration information 256 from computing device 102 and store a copy on computing device 101 (e.g., on storage medium 120 or elsewhere). Once the synchronization 282 is complete, then computing device 101, as the backup group leader, may be in-sync with the group leader, computing device 102. In such examples, after assuming backup group leader role 136 with computing device 101, instructions 126 may, at 320, periodically retrieve group heartbeat information 142 stored in text record 150 of DNS server 250 (e.g., at a rate based on the heartbeat interval for the group). In the example of FIG. 2, as described herein, the group heartbeat information 142 retrieved by instructions 126 at this time may be group heartbeat information 142 stored in text record 150 by computing device 102 having the group leader role 132, as described above. In such examples, after the promotion of computing device 101 to backup group leader role 136 and while computing device 101 has backup group leader role 136 for group 202, instructions 126 may, at each of plurality of different times, retrieve group heartbeat information 142 and an update indicator 146 (for group heartbeat information 142) from text record 150 of DNS server 250 (e.g., at a rate based on the heartbeat interval for the group). In such examples, different versions of group heartbeat information 142 and an update indicator 146 may be stored in text record 150 at different times, as computing device 102 in the group leader role is to periodically replace the group heartbeat information 142 and an update indicator 146 with current group heartbeat information 144 and a current update indicator 148 (e.g., at a rate based on the heartbeat interval for the group). In such examples, at each different time that instructions 126 retrieve group heartbeat information 142 and update indicator 146, instructions 126 may retrieve the respective versions of the group heartbeat information 142 and the update indicator 146 stored in text record 150 of DNS server 250 at that time (i.e., at the time of the retrieval).

Returning to an example in which computing device 101 has group leader role 132, in some examples, computing device 101 may restart while it has the group leader role (e.g., due to a failure, manual intervention, or any other reason). In such examples, upon restarting, computing device 101 may determine whether it is to continue performing the group leader role after the restart, or whether it is to yield the group leader role to another computing device of group 202 that has assumed the group leader role for group 202 (e.g., during the process of computing device 101 restarting). In such examples, in response to a restart of computing device 101 (having group leader role 132 at the time of beginning the restart process), instructions 126 may, at a given time, retrieve from DNS server 250 the group heartbeat information 142 and update indicator 146 that are stored in text record 150 of DNS server 250 at the given time (i.e., at the time of the retrieval). In such examples, instructions 126 may set the retrieved update indicator 146 as a local update indicator 106 of computing device 101 by, for example, storing the retrieved update indicator 146 as the local update indicator 106 in storage of computing device 101 (e.g., storage medium 120 or any other storage medium of computing device 101). In such examples, computing device 101 may have lost its local update indicator 106 value because of the restart (e.g., if it was stored in volatile storage), and so may set it again based on the update indicator 146 stored in text record 150.

In such examples, instructions 124 may determine whether the group heartbeat information 142 (retrieved from text record 150 at the given time) indicates that computing device 101 has group leader role 132. If so, then instructions 122 may resume performance of group leader role 132 with computing device 101 (e.g., since no other computing device has assumed the group leader role). Based on a determination that the group heartbeat information 142 retrieved from text record 150 at the given time indicates that another computing device (e.g., computing device 102) has group leader role 132, instructions 124 may cause computing device 101 to assume a member role 134 in group 202, and not resume performance of group leader role 132. In examples in which instructions 122 resume performance of group leader role 132 with computing device 101 as described above, resuming performance of group leader role 132 may include instructions 122 beginning to again request 285 replacement of group heartbeat information 142 and update indicator 146 (e.g., with current group heartbeat information 144 indicating that computing device 101 has group leader role 132 for group 202 and current update indicator 148). In such examples, instructions 122 may at this point use its local update indicator 106 to determine its current update indicator 148 for the request 285. In some examples, the request 285 may be a request for DNS server 250 to use an atomic multitransaction to replace group heartbeat information 142 and update indicator 146. In examples in which no other computing device is attempting to replace group heartbeat information 142 and update indicator 146 (e.g., attempting to perform the group leader role), then the atomic multitransaction of request 285 may succeed. However, if another computing device is also attempting to perform the group leader role and replace group heartbeat information 142 and update indicator 146, then use of atomic multitransaction for the requests 285 may provide that just one of the computing devices succeeds in replacing group heartbeat information 142 and update indicator 146 (and thus successfully assuming and performing the group leader role 132), to thereby avoid a split-brain situation in which two different computing devices perform the group leader role at the same time. For example, as described above in relation to atomic multitransactions, when two computing devices attempt to replace group heartbeat information 142 and update indicator 146 using respective atomic multitransactions at points in time near to each other, each of the atomic multitransactions may provide the same expected atomicity information. In such examples, as described above, instructions 272 may implement the atomic multitransactions such that just one of these is successful, as the first one to be processed may succeed and change the atomicity information 258 on DNS server 250. In such examples, the one processed later will fail because its expected atomicity information will not match the changed the atomicity information 258. In this manner, examples described herein may utilize atomic multitransactions to prevent a split-brain scenario that may otherwise result from two different computing devices attempting to assume the group leader role near in time to one another. Examples in which two different computing devices may attempt to assume the group leader role near in time to one another may be when those computing devices restart or otherwise come online (e.g., start up, obtain connection to computer network (s) 201, etc.) near in time to one another and both attempt to assume the group leader role, which could potentially lead to a split brain situation (in the absence of atomic multitransactions, for example). In such examples, use of atomic multitransactions for replacement of group heartbeat information 142 and update indicator 146 may prevent such a split-brain situation by instructions 272 allowing just one of the computing devices to replace group heartbeat information 142 and update indicator 146 with an atomic multitransaction (while the request of the other computing device is to fail, as described above).

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. Although two computing devices 101 and 102 are shown in group of computing devices 202 in FIG. 2, in other examples, group of computing devices 202 may include additional or different computing devices. In some examples, functionalities described herein in relation to FIG. 2 may be provided in combination with functionalities described herein in relation to any of FIGS. 1 and 3-5. In some examples, functionalities described herein in relation to FIG. 3 may be provided in combination with functionalities described herein in relation to any of FIGS. 1-2 and 4-5.

Figure 4:
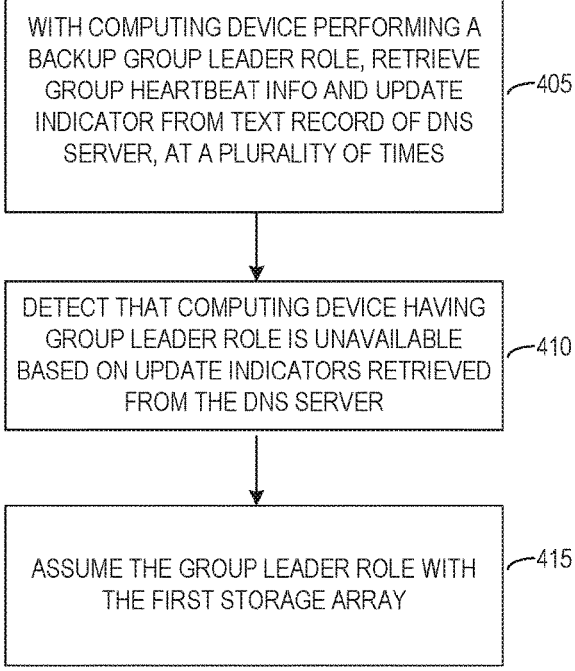
FIG. 4 is a flowchart of an example method that includes retrieving group heartbeat information and an update indicator stored in a text record of a DNS server.

Turning to FIG. 4, an example of a backup group leader retrieving group heartbeat information from a text record of a DNS server is described below in relation to FIGS. 2 and 4. FIG. 4 is a flowchart of an example method 400 including retrieving group heartbeat information and an update indicator stored in a text record of a DNS server. Although execution of method 400 is described below with reference to computing device 102 of FIG. 2, other computing devices suitable for the execution of method 400 may be utilized (e.g., computing device 101 of FIG. 1 or 2). Additionally, implementation of method 400 is not limited to such examples.

In examples described herein in relation to FIGS. 2 and 4, computing device 102 may have backup group leader role 136. In such examples, at 405 of method 400, instructions 226 of computing device 102 may retrieve, from DNS server 250, group heartbeat information 142 and an update indicator 146 for group heartbeat information 142 at each of a plurality of different times while computing device 102 has the backup group leader role 136. In some examples, instructions 226 may retrieve the group heartbeat information 142 and the update indicator 146 from text record 150 of DNS server 250, and in other examples instructions 226 may retrieve update indicator 146 from another record of DNS server 250. In some examples, each version of group heartbeat information 142 retrieved from text record 150 at each different time may identify computing device 102 as having the group leader role 132 for group 202. In examples described herein, at each different time that instructions 226 retrieve group heartbeat information 142 and update indicator 146, instructions 226 may retrieve the respective versions of the group heartbeat information 142 and the update indicator 146 stored in text record 150 of DNS server 250 at that time (i.e., at the time of the retrieval). In some examples, instructions 226 may retrieve the group heartbeat information 142 and the update indicator 146 periodically at a rate that is equal to or based on the heartbeat interval for group 202 (e.g., at each of a plurality of different times at a rate that is equal to or based on the heartbeat interval for group 202) while computing device 102 has the backup group leader role 136.

In some examples, to retrieve the group heartbeat information 142 and the update indicator 146, instructions 226 may request information in text record 150 (e.g., the payload 156 of text record 150) from DNS server 250 using a name 152 associated with text record 150, and receive payload 156 of text record 150 in response to the request. In some examples, the name 152 may be a hostname that is assigned to text record 150 on DNS server 250 and usable (e.g., as a key or index) to access text record 150, as described above. In such examples, instructions 226 may request information in text record 150 (e.g., in payload 156) from DNS server 250 using a hostname to identify text record 150 on DNS server 250. In such examples, the hostname may include a domain name associated with DNS server 250. In such examples, instructions 226 may receive payload 156 of text record 150 from DNS server 250 in response to the request using the hostname, wherein the payload includes the group heartbeat information 142 and the update indicator 146 stored in text record 150 at the time of the request.

In examples described herein, while computing device 102 has the backup group leader role 136, instructions 224 may monitor whether the group heartbeat information 142 stored in text record 150 is being updated at an expected rate (e.g., based on the heartbeat interval), or whether at least a threshold period of time has lapsed since the group heartbeat information 142 was last updated, which may indicate that the computing device having the group leader role 132 is unavailable (e.g., has failed, is having communication issues, or the like). In some examples, as described above, an update indicator may be information, such as a sequence number, that is changed by a group leader each time the group leader replaces the group heartbeat information on the DNS server. In such examples, the backup group leader may use update indicators successively retrieved form DNS server 250 to determine whether the group leader is actively replacing the group heartbeat information on the DNS server with current group heartbeat information, and as such is available and performing the group leader role. In such examples, instructions 224 may use successively retrieved update indicators 146 to determine whether at least an availability threshold period of time has lapsed without the group heartbeat information 142 being updated. For example, the availability threshold period of time may be based on the heartbeat interval (e.g., a multiple of the heartbeat interval, such as ten times the heartbeat interval). In such examples, instructions 224 may determine whether the last ten update indicators 146 for group heartbeat information 142 of text record 150 retrieved from DNS server 250 (at times separated by at least the heartbeat interval) had the same value (e.g., the same sequence number). If so, then instructions 224 may determine, based on the update indicators 146, that at least the availability threshold period of time has lapsed without the group heartbeat information 142 being updated, and detect, at 410 of method 400, that computing device 101 having group leader role 132 is unavailable. If not, then instructions 226 may continue performing the backup group leader role including retrieving the group heartbeat information and update indicator, as described above. Although the example above uses the last ten retrieved update indicators, other examples may make the determination based on any other suitable number of update indicators having the same value. In some examples, each time instructions 226 retrieve the group heartbeat information 142 and update indicator 146, instructions 224 may determine whether the retrieved update indicator 146, and thus the group heartbeat information 142, has not been updated for at least the availability threshold period of time, based on a plurality of the update indicators 146 retrieved from DNS server 250.

At 415, based at least in part on the detection at 410, instructions 222 may assume the group leader role 132 with computing device 102. In such examples, after assuming the group leader role 132, instructions 222 may periodically (based on the heartbeat interval) request 286 that DNS server 250 replace group heartbeat information 142 stored in text record 150 of DNS server 250 with current group heartbeat information 244 of computing device 102 indicating that computing device 102 has group leader role 132, as described above. In some examples, request 286 may be DNS update messages.

In some examples, computing device 102 may assume group leader role 132 based on the detection at 410 and the synchronization state in the last retrieved group heartbeat information 142. For example, based on the detection at 410, instructions 224 may determine whether the group heartbeat information 142 last retrieved from text record 150 of DNS server 250 indicates that the computing device having the backup group leader role 132 is synchronized with the computing device having the group leader role, based on the synchronization state information included in the retrieved group heartbeat information 142. When the last retrieved group heartbeat information 142 includes a synchronization state of "in-sync", instructions 224 may determine that computing device 102 having the backup group leader role 136 is synchronized with computing device 101 having the group leader role 132 and, based in part on this determination, instructions 222 assume group leader role 132 with computing device 102. When the last retrieved group heartbeat information 142 includes a synchronization state of "out-of-sync", instructions 224 may determine that computing device 102 having the backup group leader role 136 is not synchronized with computing device 101 having the group leader role 132 and, based in part on this determination, instructions 224 may determine not to assume the group leader role 132 with computing device 102, and instructions 226 may continue to perform backup group leader role 136 for group 202 with computing device 102. In examples described herein, performance of the backup group leader role and performance of a group member role each exclude providing any group heartbeat information for storage on the DNS server (e.g., DNS server 250) or to any other computing device of the group of computing devices.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
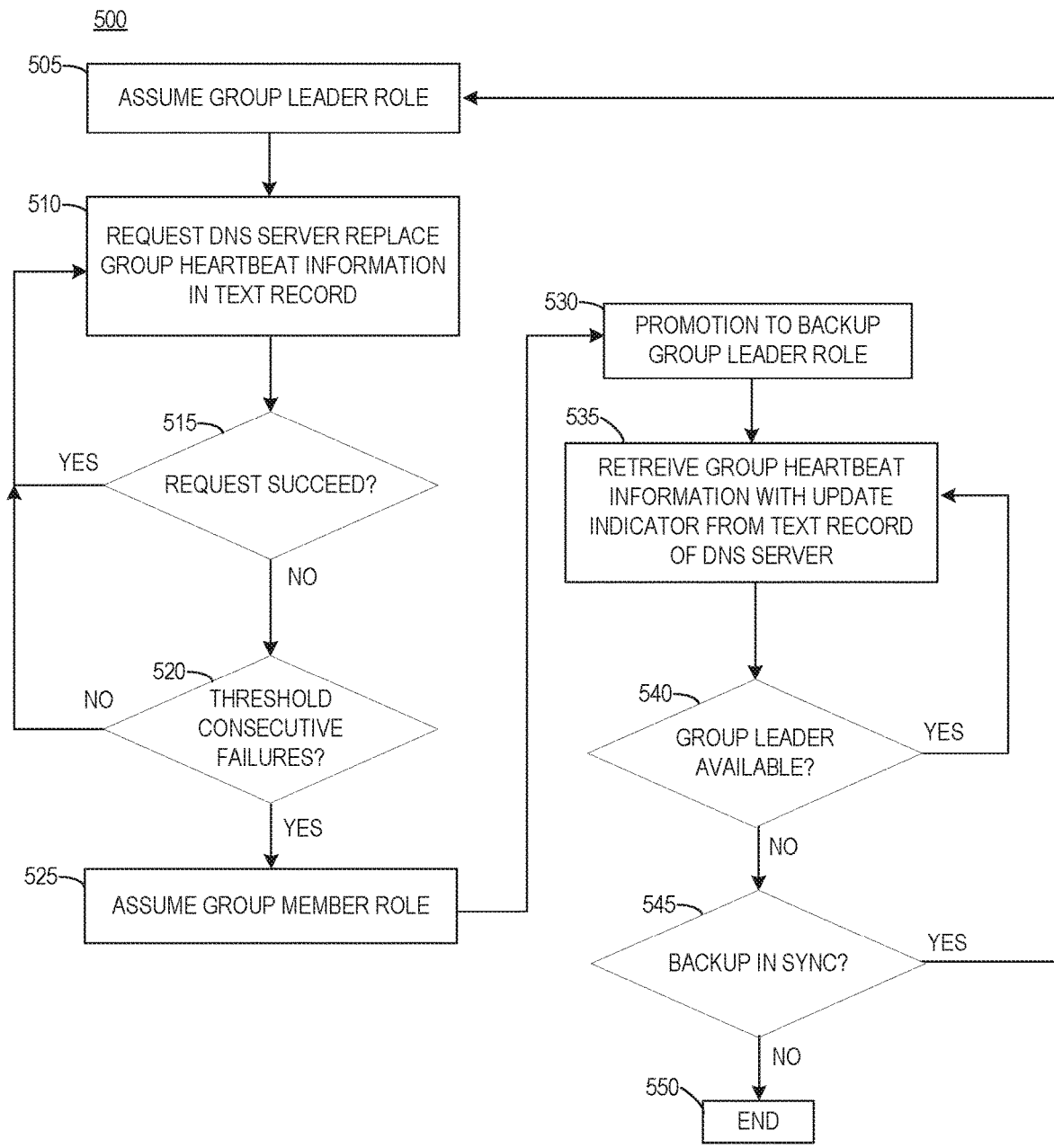
FIG. 5 is a flowchart of an example method that includes determining that a threshold number of consecutive requests failed.

FIG. 5 is a flowchart of an example method 500 including determining that a threshold number of consecutive requests failed. Although execution of method 500 is described below with reference to computing device 101 of FIG. 2, other computing devices suitable for the execution of method 500 may be utilized (e.g., computing device 102 of FIG. 2). Additionally, implementation of method 500 is not limited to such examples.

At 505 of method 500, instructions 121 of computing device 101 may cause computing device 101 to assume group leader role 132 for group 202, as described above. Then, beginning at 510, instructions 122 may periodically (e.g., based on a heartbeat interval for group 202) request 285 that DNS server 250 replace payload 156 of text record 150 with current group heartbeat information 144 of computing device 101 and a current update indicator 148 for current group heartbeat information 144. In some examples, each request 285 may be a request that DNS server 250 use an atomic multitransaction to replace payload 156 with current group heartbeat information 144 and current update indicator 148. In such examples, at 510, instructions 122 may request 285 that DNS server 250 replace payload 156 with current group heartbeat information 144 and current update indicator 148. At 515, instructions 124 may determine whether request 285 succeeded or failed. If the request 285 succeeded ("YES" at 515), then method 500 may return to 510, where instructions 122 may again request 285 that DNS server 250 replace payload 156 with current group heartbeat information 144 and current update indicator 148, after passage of at least an amount of time specified by the heartbeat interval since the prior request 285 at 510. If the request 285 failed ("NO" at 515), then method 500 may proceed to 510, where instructions 124 may determine whether a threshold number of (consecutive) requests 285 (e.g., 10, etc.) failed.

When instructions 124 determine that the threshold number of (consecutive) failures of requests 285 has not been reached ("NO" at 520), then then method 500 may return to 510, where instructions 122 may again request 285 that DNS server 250 replace payload 156 with current group heartbeat information 144 and current update indicator 148, after passage of at least an amount of time specified by the heartbeat interval since the prior request 285 at 510. When instructions 124 determine that there have been the threshold number of (consecutive) failures of requests 285 ("YES" at 520), then then method 500 may proceed to 525, where instructions 122 may cease to perform the group leader role 132 for group 202 with computing device 101, which may include ceasing to request 285 that DNS server 250 replace payload 156, and instructions 124 may cause computing device 101 to assume group member role 134 for group 202 (based on the determination at 520).

Method 500 may then proceed to 530 where, after assuming group member role 134, computing device 101 may be promoted to a backup group leader role 136 (e.g., by a computing device 102 now having the group leader role 132), and instructions 126 may cause computing device 101 to assume the backup group leader role 136. After assuming the backup group leader role 136, beginning at 535, instructions 126 of computing device 101 may periodically (e.g., based on the heartbeat interval for group 202) retrieve group heartbeat information 142 and update indicator 146 stored in text record 150 of DNS server 250 at the time of the retrieval, at each of a plurality of different times, while computing device 101 has backup group leader role 136 for group 202. In such examples, at 535, instructions 126 may retrieve group heartbeat information 142 and update indicator 146, each stored in text record 150 of DNS server 250 by computing device 102 having the group leader role 132.

After group heartbeat information 142 and update indicator 146 are retrieved at 535, then at 540, instructions 124 may determine whether computing device 102 having group leader role 132 is available, based on a plurality of update indicators 146 retrieved from DNS server 250 by computing device 101. When instructions 124 detect that computing device 102 having the group leader role 132 is available ("YES" at 535), based on a plurality of update indicators 146 retrieved from DNS server 250 by computing device 101 as described above (e.g., the last ten retrieved update indicators 146 have not had the same value), then method 500 may return to 535. At 535, instructions 126 may again retrieve group heartbeat information 142 and update indicator 146, each stored in text record 150 of DNS server 250, after passage of at least an amount of time specified by the heartbeat interval since the prior retrieval at 535.

When instructions 124 detect that computing device 102 having the group leader role 132 is unavailable ("NO" at 535), based on a threshold number of update indicators 146 retrieved from DNS server 250 having the same value (e.g., the last ten retrieved update indicators 146), then method 500 may proceed to 545. At 545, instructions 124 may determine whether the last retrieved group heartbeat information 142 indicates a synchronization state of "in-sync" or "out-of-sync". When instructions 124 determine, at 545, that the last retrieved group heartbeat information 142 indicates a synchronization state of "out-of-sync" ("NO" at 545), then computing device 102 may not assume the group leader role 132 again, and method 500 may end at 550. When instructions 124 determine, at 545, that the last retrieved group heartbeat information 142 indicates a synchronization state of "in-sync" ("YES" at 545), then computing device 102 may return to 505, where instructions 121 of computing device 101 may cause computing device 101 to again assume group leader role 132 for group 202, as described above.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a fieldprogrammable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1 and 2, storage medium 120, storage medium 220, and storage medium 270 may each be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), EEPROM, volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource, of a first computing device of a group of computing devices including a second computing device, to:
    at each of a plurality of different times while the first computing device has a group leader role for the group of computing devices:
        use a respective Domain Name System (DNS) update message to attempt to replace group heartbeat information, stored in a text record of a DNS server, with current group heartbeat information of the first computing device indicating the first computing device as having the group leader role for the group;
    based on a determination that a threshold number of the DNS update messages have failed, cause the first computing device to cease performance of the group leader role, including causing the first computing device to:
        cease attempting to replace the group heartbeat information stored in the text record of the DNS server.

2. The article of claim 1, wherein the determination that the threshold number of the DNS update messages have failed is a determination that, among the DNS update messages, the threshold number of the DNS update messages have failed consecutively.

3. The article of claim 1, wherein each respective DNS update message is a request for the DNS server to perform an atomic multitransaction that is to fail when expected atomicity information included in the DNS update message does not match atomicity information that is stored on the DNS server.

4. The article of claim 1, wherein:
    the instructions comprise instructions executable by the at least one processing resource to use each respective DNS update message to attempt to replace an update indicator for the group heartbeat information stored in the text record of the DNS server;
    the first and second computing devices are each storage arrays; and
    the DNS server is implemented by a computing device that is not in the group of computing devices.

5. The article of claim 4, wherein:
    the text record of the DNS server comprises a payload; and
    the payload comprises the group heartbeat information and the update indicator stored in the text record of the DNS server at a given one of the times, wherein the group heartbeat information includes information identifying the group, information identifying the computing device that has the group leader role for the group, and information indicating whether the computing device having the backup group leader role is synchronized with the computing device having the group leader role.

6. The article of claim 1, wherein the instructions comprise instructions executable by the at least one processing resource to:
 based on the determination that the threshold number of the DNS update messages have failed, assume a group member role for the group with the first computing device.

7. The article of claim 6, wherein the instructions comprise instructions executable by the at least one processing resource to, after promotion of the first computing device to a backup group leader role:
 at each of another plurality of different times, while the first computing device has the backup group leader role for the group:
  retrieve, from the DNS server, the group heartbeat information, and an update indicator for the group heartbeat information, each stored in the text record of the DNS server at the time of the retrieval.

8. The article of claim 6, wherein the instructions comprise instructions executable by the at least one processing resource to:
 at a given time that is at least a threshold period of time after the first computing device has assumed the member role, retrieve group heartbeat information stored in the text record at the given time; and
 based on to a determination that the first computing device is indicated as the group leader in the group heartbeat information retrieved at the given time, assume the group leader role with the first computing device.

9. The article of claim 1, wherein the instructions comprise instructions executable by the at least one processing resource to:
 in response to a restart of the first computing device:
  retrieve, from the DNS server at a given time, the group heartbeat information and an update indicator for the group heartbeat information, each stored in the text record of the DNS server at the given time the retrieval; and
  set the retrieved update indicator as a local update indicator of the first computing device.

10. The article of claim 9, wherein the instructions comprise instructions executable by the at least one processing resource to:
 based on a determination that the group heartbeat information retrieved from the text record at the given time indicates that the first computing device has the group leader role, resume performance of the group leader role with the first computing device, including requesting that the DNS server use an atomic multitransaction to replace the group heartbeat information stored in the text record of the DNS server at the time of the request, with current group heartbeat information of the first computing device indicating the first computing device as having the group leader role for the group; and
 based on a determination that the group heartbeat information retrieved from the text record at the given time indicates that the second computing device has the group leader role, assume a member role in the group with the first computing device.

11. A first computing device, of a group of computing devices including a second computing device, the first computing device comprising:
 at least one processing resource; and
 at least one non-transitory machine-readable storage medium comprising instructions executable by the at least one processing resource to:
  at each of a plurality of different times while the first computing device has a backup group leader role for the group, retrieve from a Domain Name System (DNS) server:
   group heartbeat information stored in a text record of the DNS server at the time of the retrieval, and identifying the second computing device as having a group leader role for the group; and
   an update indicator for the group heartbeat information;
  detect that the second computing device having the group leader role is unavailable, based on a determination that the group heartbeat information last retrieved from the DNS server has not been updated for at least a threshold period of time, based on a plurality of the update indicators retrieved from the DNS server; and
  based at least in part on the detection, assume the group leader role with the first computing device.

12. The first computing device of claim 11, wherein the instructions comprise instructions executable by the at least one processing resource to:
 based at least in part on the detection:
  use a DNS update message to attempt to replace the group heartbeat information stored in the text record of the DNS server with current group heartbeat information of the first computing device indicating that the first computing device has the group leader role.

13. The article of claim 11, wherein the instructions to retrieve the group heartbeat information stored in the text record comprise instructions executable by the at least one processing resource to, at each of a plurality of different times:
 request information in the text record from the DNS server using a hostname to identify the text record on the DNS server, wherein the hostname is assigned to the text record on the DNS server and includes a domain name associated with the DNS server; and
 receive a payload of the text record from the DNS server in response to the request, wherein the payload includes the group heartbeat information, and the update indicator for the group heartbeat information, stored in the text record at the time of the request.

14. The first computing device of claim 11, wherein the instructions comprise instructions executable by the at least one processing resource to:
 based on the detection, determine whether the group heartbeat information last retrieved from the text record of the DNS server indicates that the computing device having the backup group leader role is synchronized with the computing device having the group leader role; and
 based on the detection and a determination that the backup group leader role is synchronized with the computing device having the group leader role:
  assume the group leader role with the first computing device; and
  use a DNS update message to attempt to replace the group heartbeat information stored in the text record of the DNS server with current group heartbeat information of the first computing device indicating that the first computing device has the group leader role.

15. The first computing device of claim 14, wherein the instructions comprise instructions executable by the at least one processing resource to:
- based on a determination that the group heartbeat information last retrieved from the text record of the DNS server indicates that the backup group leader is not synchronized with the group leader:
  - determine not to assume the group leader role with the first computing device; and
  - perform the backup group leader role for the group with the first computing device, wherein the performance of the backup group leader role excludes providing any group heartbeat information to the DNS server or any other computing device of the group of computing devices.

16. The first computing device of claim 11, wherein a computing device to implement the DNS server is not included in the group of computing devices.

17. A method of a first storage array of a group of storage arrays separate from a computing device implementing a Domain Name System (DNS) server, the method comprising:
- at each of a plurality of different times while the first storage array is performing a group leader role for the group of computing devices:
  - requesting that the DNS server use an atomic multitransaction to replace a payload of a text record of the DNS server with current group heartbeat information of the first storage array and a current update indicator for the current group heartbeat information;
- determining that a threshold number of consecutive atomic multitransactions, requested by the first storage array, failed;
- based on the determination of the failures, ceasing to perform the group leader role for the group with the first storage array, including the first storage array ceasing to request that the DNS server replace the payload of the text record of the DNS server; and
- after assuming a backup group leader role with the first storage array, retrieving, with the first storage array, group heartbeat information stored in the text record of the DNS server by a second storage array of the group of storage arrays.

18. The method of claim 17, further comprising:
- based on the determination of the failures, assuming a group member role for the group with the first storage array.

19. The method of claim 18, wherein the retrieving comprises:
- at each of another plurality of different times, while the first storage array has the backup group leader role for the group:
  - retrieving, with the first storage array, group heartbeat information and an update indicator for the group heartbeat information, each stored in the text record of the DNS server at the time of the retrieval.

20. The method of claim 19, further comprising:
- detecting that a second storage array having the group leader role is unavailable, based on a plurality of the update indicators retrieved from the DNS server by the first storage array; and
- based on the detecting, assuming the group leader role for the group with the first computing device.

* * * * *